(12) United States Patent
Malik

(10) Patent No.: US 9,338,407 B2
(45) Date of Patent: May 10, 2016

(54) APPARATUS AND METHOD FOR PRESENTING AN ELECTRONIC PROGRAMMING GUIDE

(75) Inventor: Dale Malik, Atlanta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1652 days.

(21) Appl. No.: 12/174,927

(22) Filed: Jul. 17, 2008

(65) Prior Publication Data

US 2010/0017824 A1    Jan. 21, 2010

(51) Int. Cl.
| | |
|---|---|
| H04N 7/173 | (2011.01) |
| H04N 5/445 | (2011.01) |
| H04N 21/254 | (2011.01) |
| H04N 21/442 | (2011.01) |
| H04N 21/45 | (2011.01) |
| H04N 21/482 | (2011.01) |

(52) U.S. Cl.
CPC ....... *H04N 7/17318* (2013.01); *H04N 5/44543* (2013.01); *H04N 21/254* (2013.01); *H04N 21/44204* (2013.01); *H04N 21/44222* (2013.01); *H04N 21/4532* (2013.01); *H04N 21/482* (2013.01)

(58) Field of Classification Search
CPC .......... H04N 21/252; H04N 21/44204; H04N 21/44222; H04N 21/2688; H04N 21/2668; H04N 21/4667
USPC ............................................... 725/46, 40, 58
See application file for complete search history.

(56) References Cited

U.S. PATENT DOCUMENTS

| | | | | |
|---|---|---|---|---|
| 878,698 | A * | 2/1908 | Gossweiler ......... | E05B 65/0852 292/107 |
| 5,758,257 | A * | 5/1998 | Herz et al. .................... | 725/116 |
| 6,532,589 | B1 * | 3/2003 | Proehl et al. .................... | 725/40 |
| 7,188,355 | B1 | 3/2007 | Prokopenko et al. | |
| 7,418,672 | B2 * | 8/2008 | Stautner et al. ............... | 715/835 |
| 8,782,698 | B2 * | 7/2014 | Gossweiler et al. ............ | 725/39 |
| 2003/0084450 | A1 | 5/2003 | Thurston et al. | |
| 2003/0110492 | A1 | 6/2003 | Thurston et al. | |
| 2003/0135855 | A1 | 7/2003 | Faihe | |
| 2004/0117357 | A1 * | 6/2004 | Schirmer et al. .................. | 707/3 |
| 2004/0148347 | A1 * | 7/2004 | Appelman et al. ............ | 709/204 |
| 2005/0160452 | A1 * | 7/2005 | Lawler et al. .................... | 725/38 |

(Continued)

FOREIGN PATENT DOCUMENTS

CA    2591385 A1    7/2008

OTHER PUBLICATIONS

S.White, "Method and System for Presenting Electronic Programming Guides", U.S. Appl. No. 12/033,086, filed Feb. 2, 2008; 36 pages.

*Primary Examiner* — Pankaj Kumar
*Assistant Examiner* — Reuben M Brown
(74) *Attorney, Agent, or Firm* — Guntin & Gust, PLC; Jay H. Anderson

(57) ABSTRACT

A system that incorporates teachings of the present disclosure may include, for example, a set-top box having a controller to establish a user profile, retrieve from a media communication system media content schedules according to the user profile, determine a consumption status for each of the retrieved media content schedules, generate an Electronic Programming Guide (EPG) comprising the retrieved media content schedules, each media content schedule depicting its corresponding consumption status, and present the EPG at a media presentation device upon request. Other embodiments are disclosed.

22 Claims, 8 Drawing Sheets

(56) References Cited

U.S. PATENT DOCUMENTS

| | | | |
|---|---|---|---|
| 2005/0212504 A1* | 9/2005 | Revital et al. | 324/100 |
| 2005/0216940 A1* | 9/2005 | Black | 725/87 |
| 2007/0005629 A1* | 1/2007 | Tokuda et al. | 707/102 |
| 2007/0094292 A1* | 4/2007 | Kataoka | H04N 5/44543 |
| 2007/0130595 A1* | 6/2007 | McElhatten et al. | 725/88 |
| 2007/0157247 A1* | 7/2007 | Cordray et al. | 725/47 |
| 2009/0165049 A1* | 6/2009 | Sekiguchi | 725/39 |
| 2010/0017824 A1* | 1/2010 | Malik | 725/46 |

* cited by examiner

100

200

500

Profile Setup

Select Genres of interest

☐ Comedy  ☐ Romance  ☐ News

☐ Drama   ☐ Action   ☐ Sports

●
●
●

Select Channels of interest

[CH XX ▼]   [Add]

Select Shows of interest

[Genre ▼]   [Shows ▼]   [Add]

Select Performers of interest

[Performers ▼]   [Add]

Select Producers/Directors of interest

[Prod/Dir ▼]   [Add]

APPARATUS AND METHOD FOR PRESENTING AN ELECTRONIC PROGRAMMING GUIDE

FIELD OF THE DISCLOSURE

The present disclosure relates generally to Electronic Programming Guides (EPGs) and more specifically to an apparatus and method for presenting an EPG.

BACKGROUND

Electronic programming guides are useful tools for guiding subscribers in selecting from a large suite of media content. Common sources of media content include without limitation on-line radio programs, and television (TV) programs supplied by media communication systems such as satellite TV, cable TV, and Internet Protocol TV.

BRIEF DESCRIPTION OF THE DRAWINGS

FIGS. 6-7 depict illustrative embodiments of the method of FIG. 5; and

DETAILED DESCRIPTION

One embodiment of the present disclosure entails a Set-Top Box having a controller to establish a user profile, retrieve from a media communication system media content schedules according to the user profile, determine a consumption status for each of the retrieved media content schedules, generate an Electronic Programming Guide (EPG) comprising the retrieved media content schedules, each media content schedule depicting its corresponding consumption status, and present the EPG at a media presentation device upon request.

Another embodiment of the present disclosure entails a method involving assembling an EPG from media content schedules retrieved from a media communication system according to a user profile, wherein at least one the media content schedules depicts a consumption status of media content associated therewith.

Yet another embodiment of the present disclosure entails a computer-readable storage medium having computer instructions for generating an EPG including a plurality of media content schedules selected according to a profile, and a consumption status depicted in at least each of a portion of the plurality of media content schedules.

Figure 1:
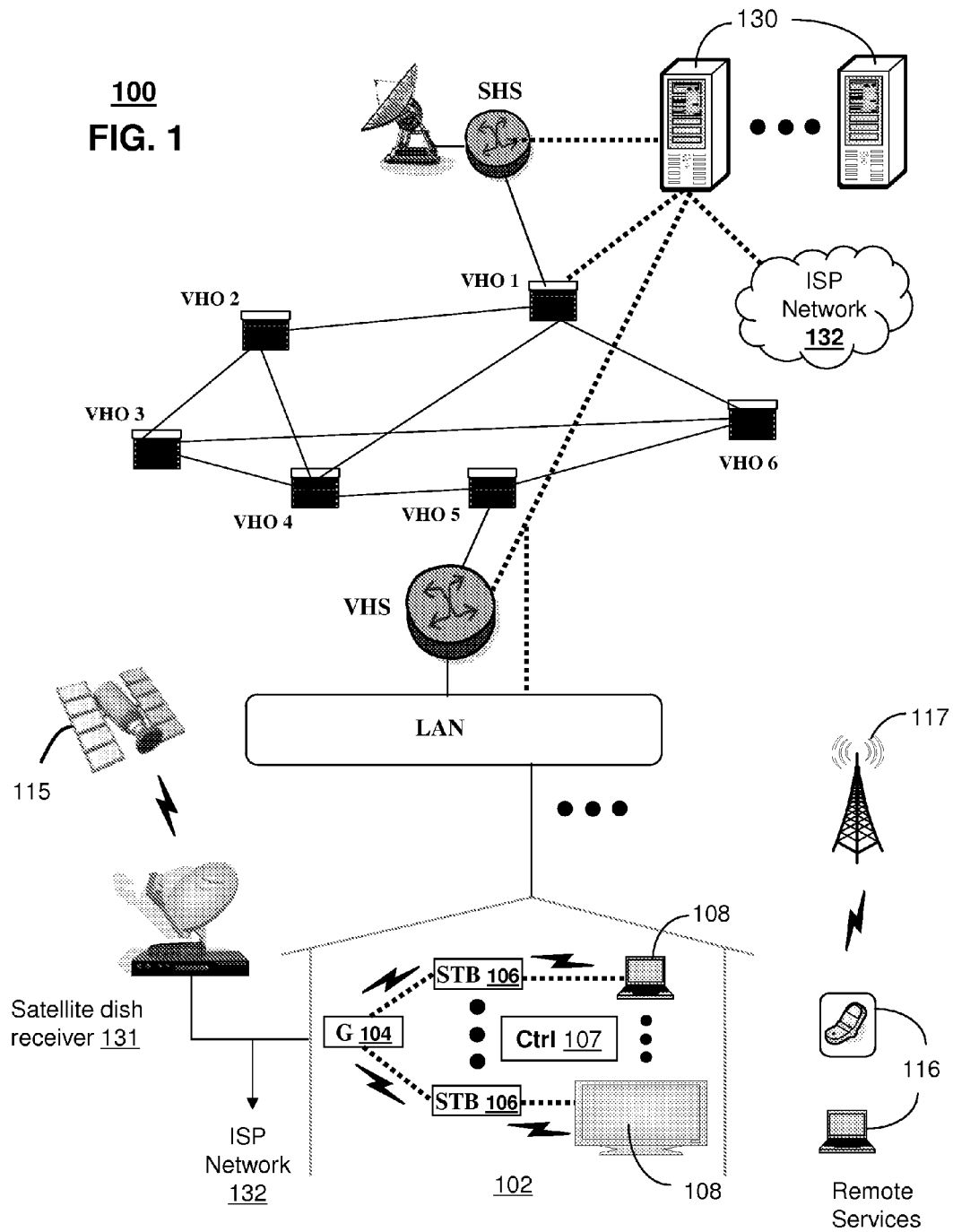
FIGS. 1-3 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as an electronic programming guide (EPG) system 130 for presenting media content schedules to subscribers of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
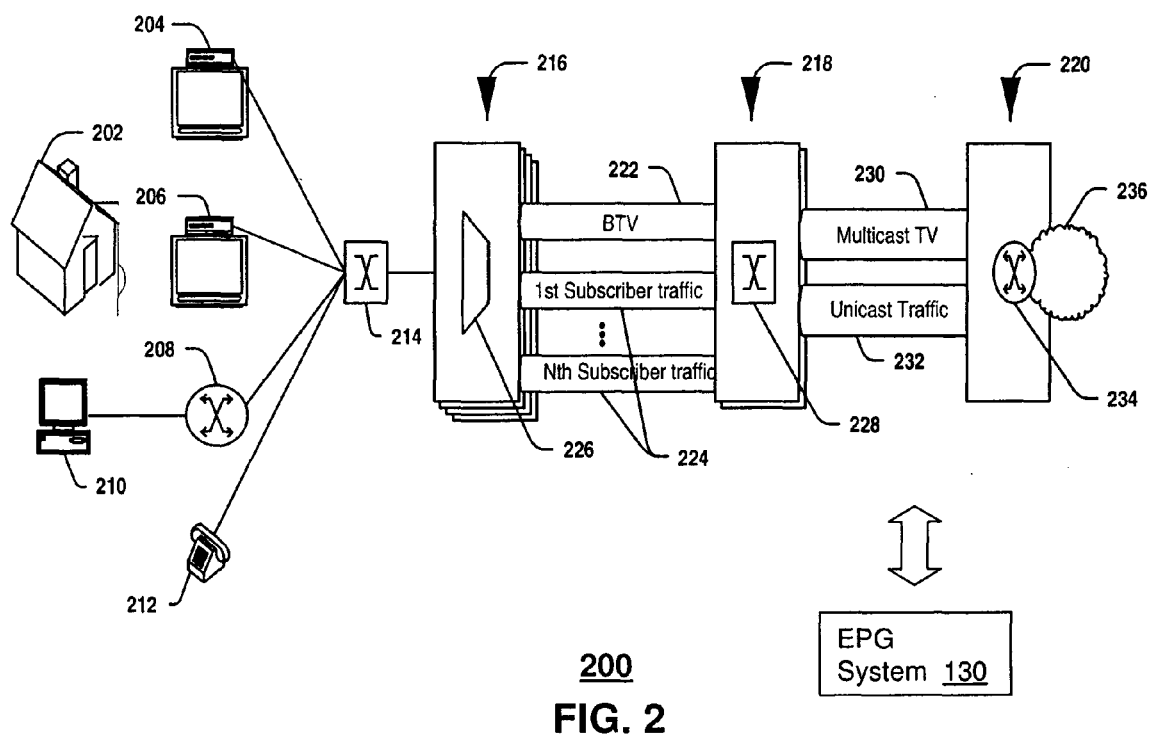

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The EPG system 130 of FIG. 1 can be operably coupled to the second communication system 200 for purposes similar to those described above.

Figure 3:
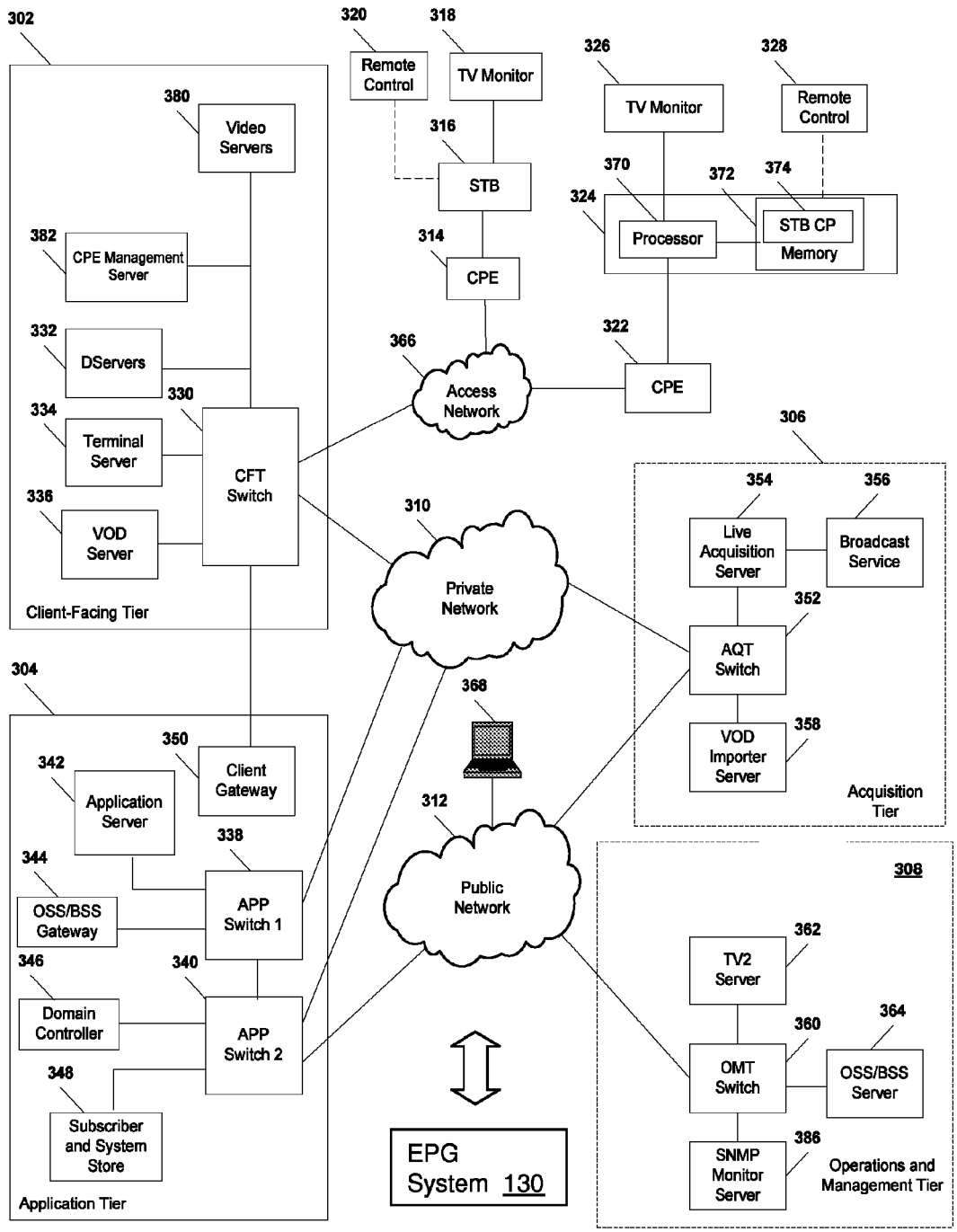

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The EPG system 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
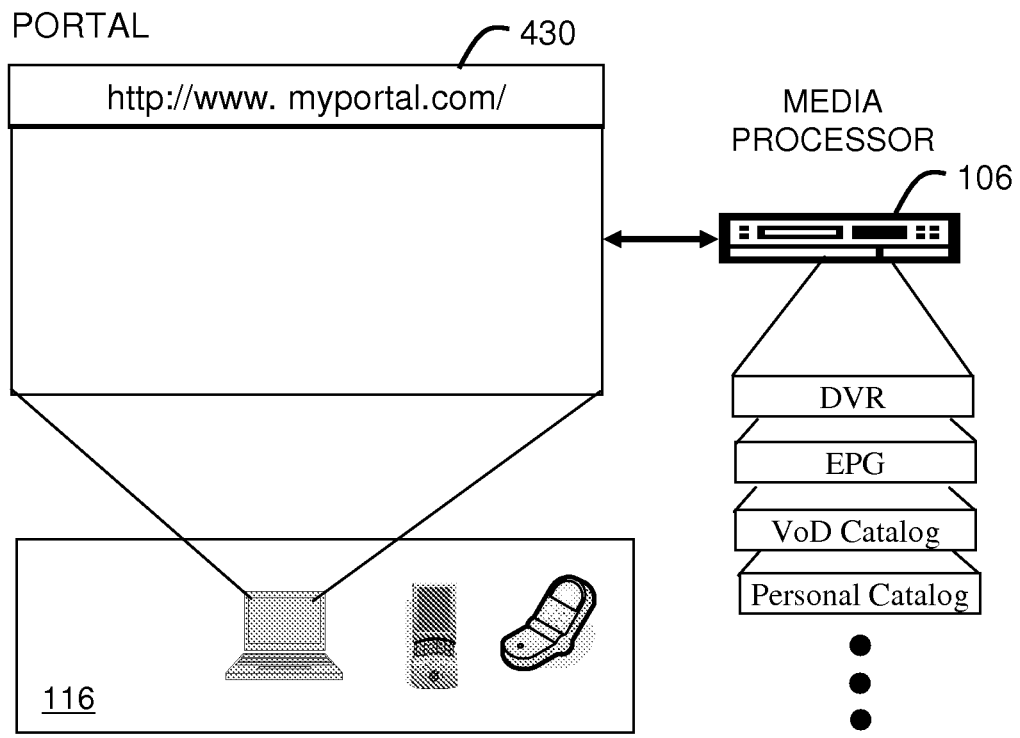
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 5:
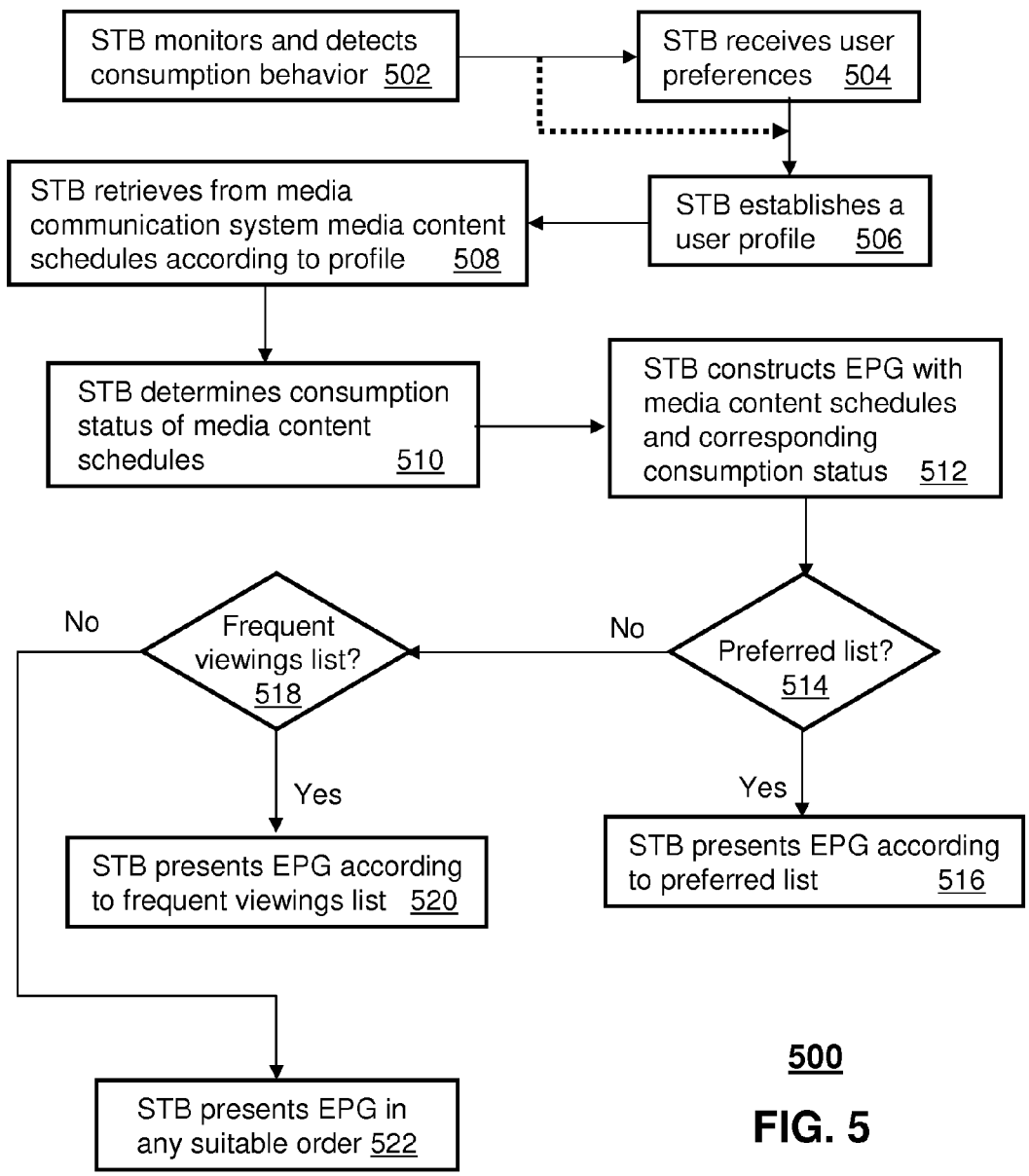
FIG. 5 depicts an illustrative method operating in portions of the communication systems of FIGS. 1-4.
Figure 7:
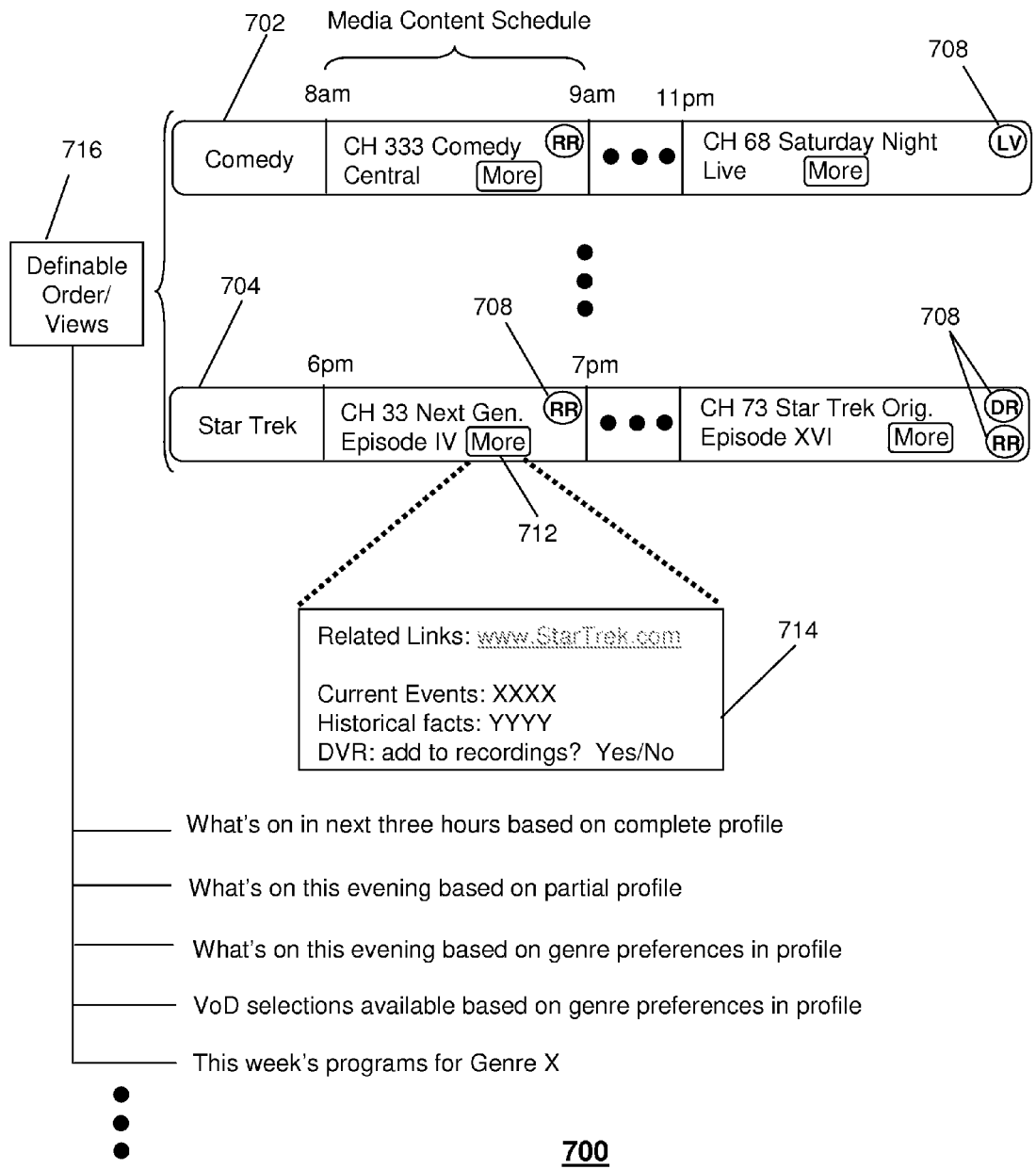

FIG. 5 depicts an illustrative method 500 operating in portions of communication systems 100-300. FIGS. 6-7 depict illustrative embodiments of method 500. Method 500 begins with step 502 in which a media processor such as an STB of FIGS. 1-3 monitors and detects consumption behaviors of a user of the STB. Alternatively, or in combination, the STB can receive from the user of the STB user preferences for media content. These preferences can include for example preferences for particular media programs (e.g., Star Trek, 48 Hours, Radio programs of interest, etc.), preferences for media programs by genre (Comedy, Family-oriented), content ratings such as G, PG, PG-13, etc., or other suitable preferences such as artists, directors, producers, and so on. Other user-defined preferences that can assist the STB in identifying the likes and/or dislikes of the user can be applied to the present disclosure. Since it can be a daunting tasks to define all forms of preferences, the behavioral information collected in step 502 can be combined with the preferences supplied in step 504 to form a comprehensive user profile in step 506.

In accordance with the user profile, the STB can retrieve in step 508 media content schedules from one or more databases operating in EPG system 130 of the aforementioned media communication systems of FIGS. 1-3. These databases can comprise a comprehensive list of media content schedules for all media program channels offered by the media communication system. Rather than download an entire database, the STB can sift through the database for media programs that match the user profile. The media content schedules selected in step 508 can for example identify presentation schedules for the media programs that match the user profile, as well as other details (e.g., channel number on the STB, website(s) with related information, etc.).

In step 510 the STB can further determine a consumption status of the media content schedules. A consumption status can indicate a state of consumption of a media program for a select schedule. For example, a select media content schedule can indicate that a media program associated with the schedule is a rerun. That is, the media program has been presented on prior occasions and is therefore not a first-time presentation. The select media content schedule can also indicate that a DVR coupled to or integrated with the STB is programmed to record the media program at the scheduled presentation time. The consumption status can be retrieved from the databases of the EPG system 130 as well as from a DVR coupled to or an integral part of the STB.

Once the consumption status has been determined, the STB constructs in step 512 a customized EPG for the user (or users) of the STB which includes media content schedules, each with a corresponding consumption status. Prior to presenting the EPG requested by a user, the STB can be programmed in step 514 to determine whether the user profile has provided a preferred list of media content. A preferred list can be useful when the EPG is organized by rows, each row representing a particular media program, genre, or other category of interest, and the number of rows is greater than the viewing area of a media presentation device such as a computer monitor, television screen, phone screen, and so on. The EPG can be presented in step 516 according to a preferred list consisting of for example the top ten media programs, genres, or other category of interest of the user.

If a preferred list is not requested, the STB can determine in step 518 whether the user profile directs the STB to organize media schedules according to the most frequently viewed schedules. If such a request is made, the STB can present in step 520 the EPG showing media schedules according to a frequency of viewings of the schedules based on for example the most frequently viewed schedule first, the least frequently viewed schedule last, and others in between ordered according to their respective frequency of viewings. The STB can periodically update the organization of the media content schedules as the average frequency of viewings change. If neither a preferred list or frequency of viewings list is identified in the user profile, the STB can proceed to step 522 and present the EPG in any suitable order (e.g., alphabetical, by genre, etc.).

FIG. 6 presents an illustrative embodiment for establishing a profile according to method 500. In this illustration, an STB can present a user a GUI with a number of prompts to assist the user in defining his/her preferences. For instance, the user can be asked to select genres of interest for all available programs. A user can also define channels of interest by selecting channels from a drop-down menu (or by entering channel numbers) and adding each channel to a preference list stored by the STB. The user can also select shows of interest by first selecting a genre and selecting shows associated with the genre. Each show selected can be added to a preference list of shows stored by the STB. Additionally, the user can select performers of interest and/or producers and directors of interest, which singly or in combination can generate preference lists as well. The user profile illustrated can be much more comprehensive than what is shown in FIG. 6. Moreover, the user profile can generate additional windows or GUIs based on a nested selection of preferences by the user. The user profile preferences entered manually by the user can also be enhanced by pattern recognition preferences detected by the STB.

FIG. 7 presents an illustrative embodiment of a customized EPG resulting from the steps of method 500. In this illustration, an EPG is presented in rows, each row identified by a genre 702, media program 704, or other identifiable category such as for example artists, directors, producers, and so on, which the user profile identifies as a category of interest to the user. Each media content schedule can include a schedule, a number of selectable items such a channel number, a "more" GUI button 712, and symbol(s) 708 indicating a consumption status. Consumption status is illustrated in FIG. 7 by text symbols (e.g., LV for live presentation, RR for re-run presentation, DR for digital media recording, and so on). The symbol DR can be selected to invoked a menu from a DVR coupled to or integral to the STB. Thus a user can control and/or reprogram a DVR setting by way of selecting a consumption status symbol of the EPG. Additionally, a media content schedule can have more than one consumption status (see Star Trek Orig. Episode XVI).

Upon selecting the More GUI button 712, the STB can present a GUI 714 with related links for the media program, current events, historical facts, and/or an option to add the media program to the DVR recording schedule. As noted earlier, the EPG can be organized by any definable view, category or order (genre, artists, media program, etc.), each row including selectable media content schedules (with selectable sub-elements) of the category of interest.

For example, a user can request a view of the EPG that shows programming for the next three hours based on all aspects of the user's profile. In another illustrative embodiment, the user can request programming for the evening based on partial preferences listed in the profile. In yet another viewing, a user can request programming for the evening based on genre preferences. The user can also request a viewing of VoD selections based on genre preference in the profile. In yet another illustrative embodiment, the user can request programs for a calendar period such as a week for a select genre (X). Viewing formats and/or the order of presenting media program schedules can be defined by the user in the profile, and/or can be offered by the STB as selectable viewing formats in drop-down menus.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that the aforementioned steps occur at the EPG system 130 in whole or in part for at least a portion of STB subscribers. This option can be useful for subscribers who do not have an STB that has the sophistication described above. Accordingly, a service provider of the aforementioned media communication systems can have some subscribers with STBs that perform some or all of the functions of method 500, while other subscribers procure the services of EPG system 130 to perform these functions remotely.

Other suitable modifications can be applied to the present disclosure without departing from the scope of the claims below. Accordingly, the reader is directed to the claims section for a fuller understanding of the breadth and scope of the present disclosure.

Figure 8:
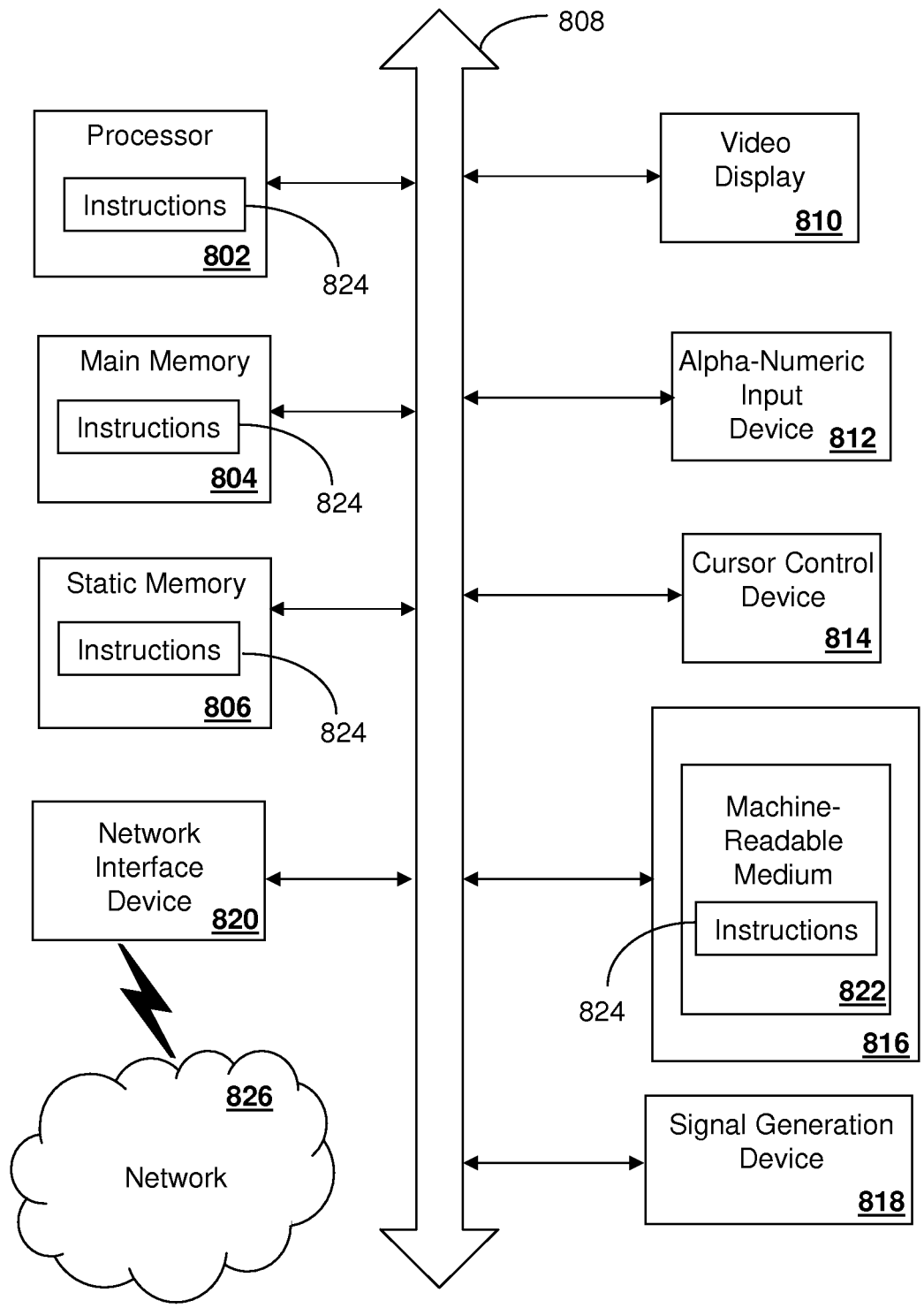
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set-top box, comprising:
a memory to store instructions; and
a processor coupled to the memory, wherein responsive to executing the instructions, the processor performs operations comprising:
establishing a user profile;
retrieving from a media communication system media content schedules according to the user profile;
determining a consumption status for each of the retrieved media content schedules, wherein the consumption status of each of the retrieved media content schedules indicates media content items associated with the retrieved media content schedule correspond to a rerun of the media content, a new episode of the media content, or a live presentation of the media content;
searching content sources associated with the retrieved media content schedules, wherein the content sources comprise a fan club of media content, a description of current events associated with media content, or a blog website associated with media content;
generating an electronic programming guide comprising the retrieved media content schedules, wherein the retrieved media content schedules depict the corresponding consumption status for each of the media content schedules;
determining whether a preferred list of media content is provided;
providing an expanded electronic programming guide presenting the content sources associated with the retrieved media content schedules;
presenting, at a media presentation device upon receiving a request, the expanded electronic programming guide with the media content schedules according to the preferred list when the preferred list is provided;
determining whether a frequent viewings list is provided when the preferred list is not provided;
presenting, at the media presentation device upon receiving the request, the expanded electronic programming guide with the media content schedules according to the frequent viewings list when the frequent viewings list is provided; and
presenting, at the media presentation device upon receiving a selection of a symbol representing the consumption status, a menu for controlling a recording device to record the media content.

2. The set-top box of claim 1, wherein the consumption status of one of the retrieved media content schedules indicates the media content item associated with the media content schedule corresponds to an indication the media content item is being recorded or is scheduled to be recorded by the recording device, and wherein the recording device is integral to the set-top box.

3. The set-top box of claim 1, wherein the operations further comprise:
monitoring a plurality of requests for media program presentations;
detecting a pattern in the plurality of requests; and
establishing the user profile from the detected pattern.

4. The set-top box of claim 1, wherein the operations further comprise:
detecting selections made by a user corresponding to media content preferences; and
establishing the user profile from the media content preferences.

5. The set-top box of claim 4, wherein the media content preferences correspond to genre preferences, media content rating preferences, or preferred media programs.

6. The set-top box of claim 1, wherein the symbol representing the consumption status comprises an identifier, an iconic symbol, or a color-coded scheme.

7. The set-top box of claim 1, wherein the preferred list and the frequent viewings list are provided according to the user profile, and wherein the operations further comprise:
presenting the expanded electronic programming guide with the media content schedules arranged alphabetically or by genre when the preferred list and the frequent viewings list are not provided.

8. The set-top box of claim 1, wherein the operations further comprise organizing the electronic programming guide in a plurality of rows, each row comprising a media program and a portion of the media content schedules associated with the media program.

9. The set-top box of claim 1, wherein the media content comprises audio content, still image content, moving image content or combinations thereof.

10. The set-top box of claim 1, wherein the media communication system comprises a media content portal, a satellite television communication system, or a cable television communication system.

11. A method, comprising:
receiving, by a system comprising a processor, selections by a user corresponding to media content preferences including a channel of interest to the user;
establishing, by the system, a user profile from the media content preferences;
assembling, by the system, an electronic programming guide comprising media content schedules retrieved from a media communication system according to the user profile, wherein one of the media content schedules depicts a consumption status of media content associated therewith, wherein one of the media content schedules presents content sources associated with the retrieved media content schedules and wherein the content sources comprise a fan club of media content, a description of current events associated with media content, or a blog website associated with media content;

determining, by the system, whether a preferred list of media content is provided;

providing, by the system, an expanded electronic programming guide presenting the content sources associated with the retrieved media content schedules;

presenting, by the system, on at least one of the media content schedules a graphical user interface adapted to display additional content associated with the media content upon selection;

presenting, by the system at a media presentation device upon receiving a request, the expanded electronic programming guide with the media content schedules according to the preferred list when the preferred list is provided;

determining, by the system, whether a frequent viewings list is provided when the preferred list is not provided;

presenting, by the system at the media presentation device upon receiving the request, the expanded electronic programming guide with the media content schedules according to the frequent viewings list when the frequent viewings list is provided; and presenting, by the system at the media presentation device upon receiving a selection of a symbol representing the consumption status, a menu for controlling a recording device to record the media content.

12. The method of claim 11, wherein the consumption status of indicates the media content associated with the media content schedule corresponds to a rerun of the media content, a new episode of the media content, a live presentation of the media content, or an indication the media content is being recorded or is scheduled to be recorded by the recording device.

13. The method of claim 11, further comprising:
monitoring, by the system, a plurality of requests for media program presentations;
detecting, by the system, a pattern in the plurality of requests; and
establishing, by the system, the user profile from the detected pattern.

14. The method of claim 11, wherein the symbol representing the consumption status comprises an identifier, an iconic symbol or a color-coded scheme.

15. The method of claim 11, wherein the preferred list and the frequent viewings list are provided according to the user profile, and further comprising presenting, by the system, the expanded electronic programming guide with the media content schedules arranged alphabetically or by genre when the preferred list and the frequent viewings list are not provided.

16. The method of claim 11, further comprising searching, by the system, for the content sources associated with each media content schedule.

17. The method of claim 11, wherein the media content comprises audio content, still image content, moving image content, or combinations thereof, and wherein the media communication system comprises a social networking portal a satellite television communication system, or a cable television communication system.

18. A machine-readable storage device comprising instructions, wherein responsive to executing the instructions, a processor performs operations comprising:

generating an electronic programming guide including a plurality of media content schedules selected according to a profile and including a consumption status depicted as a consumption status symbol in each of a portion of the plurality of media content schedules, the profile including user media content preferences;

presenting in an electronic programming guide content sources associated with one of the media content schedules, wherein the content sources comprise a fan club of media content, a description of current events associated with media content or a blog website associated with media content;

determining whether a preferred list of media content is provided;

presenting an expanded electronic programming guide including the content sources associated with the media content schedules;

controlling a digital video recorder in response to a selection of the consumption status symbol;

presenting, at a media presentation device upon receiving a request, the expanded electronic programming guide with the media content schedules according to the preferred list when the preferred list is provided;

determining whether a frequent viewings list is provided when the preferred list is not provided;

presenting, at the media presentation device upon receiving the request, the expanded electronic programming guide with the media content schedules according to the frequent viewings list when the frequent viewings list is provided; and presenting, at the media presentation device upon receiving a selection of the consumption status symbol, a menu for controlling a recording device to record the media content.

19. The machine-readable storage device of claim 18, wherein the consumption status of one of the media content schedules indicates the media content associated with the media content schedule corresponds to a rerun of the media content, a new episode of the media content, a live presentation of the media content, or an indication the media content is being recorded or is scheduled to be recorded by the recording device.

20. The machine-readable storage device of claim 18, wherein the profile corresponds to a user profile.

21. The machine-readable storage device of claim 20, wherein the operations further comprise establishing the user profile from a detection of consumption patterns of media content.

22. The machine-readable storage device of claim 18, wherein the operations further comprise depicting the consumption status as a color-coded scheme.

* * * * *

UNITED STATES PATENT AND TRADEMARK OFFICE
CERTIFICATE OF CORRECTION

PATENT NO.        : 9,338,407 B2
APPLICATION NO.   : 12/174927
DATED             : May 10, 2016
INVENTOR(S)       : Dale Malik Page 1 of 1

It is certified that error appears in the above-identified patent and that said Letters Patent is hereby corrected as shown below:

In the Claims

Column 15, line 57 (Claim 17), after "portal" please insert --,--.

Signed and Sealed this
Twenty-eighth Day of June, 2016

Michelle K. Lee
*Director of the United States Patent and Trademark Office*